United States Patent
Chen et al.

(10) Patent No.: US 10,785,158 B1
(45) Date of Patent: Sep. 22, 2020

(54) SYSTEM AND METHOD FOR PROVISIONING BOTH IPV4 AND IPV6 INTERNET SERVICE AND LOAD BALANCER SERVICE

(71) Applicant: CHUNGHWA TELECOM CO., LTD., Taoyuan (TW)

(72) Inventors: Chen-Hsiang Chen, Taoyuan (TW); Chia-Wei Huang, Taoyuan (TW); Wei-Te Wu, Taoyuan (TW); Yao-Te Huang, Taoyuan (TW)

(73) Assignee: CHUNGHWA TELECOM CO., LTD., Taoyuan (TW)

( * ) Notice: Subject to any disclaimer, the term of this patent is extended or adjusted under 35 U.S.C. 154(b) by 0 days.

(21) Appl. No.: 16/594,372

(22) Filed: Oct. 7, 2019

(30) Foreign Application Priority Data

May 22, 2019 (TW) .............................. 108117680 A

(51) Int. Cl.
*H04L 29/08* (2006.01)
*H04L 12/803* (2013.01)
*H04L 12/911* (2013.01)
*H04L 12/927* (2013.01)
*H04L 29/12* (2006.01)
*H04L 12/851* (2013.01)

(52) U.S. Cl.
CPC ........ *H04L 47/125* (2013.01); *H04L 47/2425* (2013.01); *H04L 47/781* (2013.01); *H04L 47/805* (2013.01); *H04L 61/2061* (2013.01); *H04L 61/251* (2013.01); *H04L 61/6086* (2013.01)

(58) Field of Classification Search
CPC ........................... H04L 47/125; H04L 47/781
See application file for complete search history.

(56) References Cited

U.S. PATENT DOCUMENTS

| 2015/0063166 A1* | 3/2015 | Sif ...................... G06F 9/45558 370/254 |
| 2016/0323377 A1* | 11/2016 | Einkauf ................ G06F 9/5083 |

* cited by examiner

*Primary Examiner* — Adnan M Mirza
(74) *Attorney, Agent, or Firm* — Amin, Turocy & Wason, LLP

(57) ABSTRACT

A system and method provisions IPv4 and IPv6 Internet service and load balancer service. An Internet service and load balancer service provisioning module provisions or activates IPv4 or IPv6 Internet service and load balancer service of a VPC environment. A service chain provisioning management unit manages a lifecycle of activating or terminating of the Internet service and load balancer service, and records orders and provisioning processes of a plurality of service nodes. A network resource enablement and setting unit communicates with the service nodes to activate and set each of the service nodes. A network resource management and allocating unit establishes IP resource pools based on different usages of an IPv4 subnet and an IPv6 subnet, and selects the IP resource pools based on usages to obtain a usable IP address. An IPv4 and IPv6 subnets IP resource pools management module manages the IP resource pools.

20 Claims, 12 Drawing Sheets

_311_

IPv4 routing table of VPC router

- Internet interface IP : 210.1.1.1
  → source IP resource pool : IPv4 Internet interface IP resource pool
- load balance interface IP : 210.1.3.1
  → source IP resource pool : IPv4 network node router IP resource pool
- VPC routing table setting :

| destination network segment address | direction | belonged resource pool |
|---|---|---|
| 210.1.4.1 | operating system updating server | N/A |
| 210.1.5.1 | VPC host monitoring service server | N/A |
| 10.1.0.0/24 | IPv4 VPC load balancer | resource pool of IPv4 user subscribe service subnet |
| 0.0.0.0 | Internet gateway | predefined router |

FIG. 5A

501 — IPv4 routing table of Internet gateway

| destination network segment address | direction | belonged resource pool |
|---|---|---|
| 210.1.2.4/30 | VPC router | IPv4 Internet connection IP resource pool | routing table setting

FIG. 5B

*321* routing table of IPv4 VPC load balancer

- northbound interface IP : 210.1.3.7
  →source IP resource pool : IPv4 network node router IP resource pool
- southbound interface IP : 10.1.0.254
  →source IP resource pool : IPv4 host subnet IP resource pool
- virtual IP : 10.1.1.201
  →source IP resource pool : IPv4 load balancer use IP resource pool
- routing table setting :

| destination network segment address | direction | belonged resource pool |
|---|---|---|
| 0.0.0.0 | VPC router | predefined router |

IPv6 routing table of VPC router

- Internet interface IP : 2001:1234:1234:1000::2/64
  → source IP resource pool : IPv6 Internet interface IP resource pool
- load balance interface IP : 2001:1234:1234:3000::1/124
  → source IP resource pool : IPv6 network node router IP resource pool

| destination network segment address | direction | belonged resource pool |
|---|---|---|
| 2001:1234:1234:4000::1/64 | operating system updating server | N/A |
| 2001:1234:1234:5000::1/64 | VPC host monitoring service server | N/A |
| 2001:1234:1234:2000::/64 | IPv6 VPC load balancer | IPv6 host subnet IP resource pool |
| 0::/0 | Internet gateway | predefined router |

FIG. 7A

| IPv6 routing table of Internet gateway — 502 |||
| routing table setting |||
| destination network segment address | direction | belonged resource pool |
| --- | --- | --- |
| 2001:1234:1234:2000::/64 | VPC router | IPv6 host subnet IP resource pool |

FIG. 7B routing table of IPv6 VPC load balancer ~331

- northbound interface IP : 2001:1234:1234:3000::2/124
  → source IP resource pool : IPv6 network node router IP resource pool
- southbound interface IP : 2001:1234:1234:2000::1/64
  → source IP resource pool : IPv6 host subnet IP resource pool
- virtual IP : 2001:1234:1234:2000:FFFF::1/80
  → source IP resource pool : IPv6 load balancer use IP resource pool

| destination network segment address | direction | belonged resource pool |
|---|---|---|
| 0::/0 | VPC router | predefined router |

FIG. 7C

SYSTEM AND METHOD FOR PROVISIONING BOTH IPV4 AND IPV6 INTERNET SERVICE AND LOAD BALANCER SERVICE

CROSS-REFERENCE TO RELATED APPLICATIONS

This application claims priority to Taiwan Application Serial No. 108117680, filed on May 22, 2019. The entirety of the application is hereby incorporated by reference herein and made a part of this specification.

BACKGROUND

1. Technical Field

The present disclosure relates to Internet service and load balancer service provisioning techniques, and, more particularly, to a system and method for provisioning both IPv4 and IPv6 Internet service and load balancer service.

2. Description of the Prior Art

According to the prior art, a system and a method were proposed to employ a virtual server mixed mode to process Internet Protocol version 6 (IPv6) and Internet Protocol version 4 (IPv4) traffic. A virtual server is used to manage Internet traffic from IPv4 and IPv6 of different user ends. The virtual server records the IP of a source end, determines Internet protocol based on a header of a transport layer, and directs the traffic to a server that supports the Internet protocol. That is, the traffic of IPv4 is directed to a server that supports IPv4, while traffic of IPv6 is directed to a server that supports IPv6, so as to realize a load balance that supports two different Internet protocols. However, the server in the prior art only supports one of Internet protocols in IPv4 and IPv6, and does not support both of the Internet protocols and load balancer service.

According to the prior art, a method and equipment were proposed to maintain an IPv6 cloud host through an IPv4 terminal. A user end may use an IPv4 terminal from an external network, connected via a Web management module, and transmit the identity information of the user end to an authorization management module for identification. After being identified successfully, the user end transmits the operation requests (e.g., the creation, deletion and modulation of a cloud host) through the Web management module to a proxy module, the operation requests including information of a target cloud host. If the network card of the target cloud host is set to be IPv6, the proxy module will encapsulate messages into an IPv6 and transmit the messages to the target cloud host, to realize the control of the IPv6 cloud host by the user end having a source of IPv4. However, this prior art only provides the message protocol transformation between the IPv4 user end and IPv6 cloud host, to allow the user end having a source of IPv4 to manage the IPv6 cloud host, and still cannot support both of the Internet protocols and load balancer service of IPv4 and IPv6.

SUMMARY

The present disclosure provides a system and method for provisioning both IPv4 and IPv6 Internet service and load balancer service for provisioning two different Internet protocols and load balancer services of IPv4 and IPv6.

The system for provisioning both IPv4 and IPv6 Internet service and load balancer service according to the present disclosure comprises an Internet service and load balancer service provisioning module deployed in a first electronic device and configured for provisioning or activating IPv4 or IPv6 Internet service and load balancer service in a virtual private cloud (VPC) environment, the Internet service and load balancer service provisioning module having a service chain provisioning management unit configured for managing a lifecycle of activating or terminating the Internet service and load balancer service, and for recording a plurality of service nodes provisioned for activating or terminating the Internet service and load balancer service, and an order of the plurality of service nodes and provisioning processes of each of the service nodes, wherein in a activating or terminating stage of the Internet service and load balancer service, the service chain provisioning management unit serially integrates the plurality of service nodes into a service chain based on the order of the plurality of service nodes; a network resource enablement and setting unit configured for communicating with each of the service nodes for activating and setting each of the service nodes; and a network resource management and allocating unit configured for establishing a plurality of IP resource pools based on different usages of an IPv4 subnet and an IPv6 subnet, selecting an IP resource pool from the plurality of IP resource pools based on usages, and obtaining an available IP address from the selected IP resource pool; and an IPv4 and IPv6 subnets IP resource pools management module deployed in the first electronic device or a second electronic device and configured for managing the plurality of IP resource pools established by the network resource management and allocating unit based on the different usages of the IPv4 subnet and the IPv6 subnet.

The method for provisioning both IPv4 and IPv6 Internet service and load balancer service according to the present disclosure comprises: provisioning or activating, by an Internet service and load balancer service provisioning module of a first electronic device, IPv4 or IPv6 Internet service and load balancer service in a VPC environment; managing, by the Internet service and load balancer service provisioning module of the first electronic device, a lifecycle of activating or terminating the Internet service and load balancer service, and recording a plurality of service nodes provisioned for activating or terminating the Internet service and load balancer service, and an order of the plurality of service nodes and provisioning processes of each of the service nodes, wherein in a activating or terminating stage of the Internet service and load balancer service, the Internet service and load balancer service provisioning module serially integrates the plurality of service nodes into a service chain based on the order of the plurality of service nodes; establishing, by the Internet service and load balancer service provisioning module of the first electronic device, a plurality of IP resource pools based on different usages of an IPv4 subnet and an IPv6 subnet, selecting, by the Internet service and load balancer service provisioning module, an IP resource pool from the plurality of IP resource pools based on a usage, and obtaining a useable IP address from the selected IP resource pool; managing, by an IPv4 and IPv6 subnets IP resource pools management module of the first electronic device or a second electronic device, the plurality of IP resource pools established by the Internet service and load balancer service provisioning module based on the different uses of the IPv4 subnet and the IPv6 subnet; and communicating, by the Internet service and load balancer service provisioning module of the first electronic device, with each of the service nodes to activate and set each of the service nodes.

It will be readily understood that the system and method according to the present disclosure, as generally described and illustrated in the drawings herein, may be arranged and designed in a wide variety of different configurations in addition to the system and method described herein. Thus, the following detailed description of the system and method, as represented in the drawings, is not intended to limit the scope defined by the appended claims but is merely representative of selected system and method. The following description is intended by way of example, and simply illustrates certain concepts of the system and method, as disclosed and claimed herein.

BRIEF DESCRIPTION OF THE DRAWINGS

FIG. 5A is an IPv4 routing table of a VPC router of FIG. 4 according to the present disclosure;

FIG. 5B is an IPv4 routing table of an Internet gateway of FIG. 4 according to the present disclosure;

FIG. 5C is a routing table of an IPv4 VPC load balancer of FIG. 4 according to the present disclosure;

FIG. 7A is an IPv6 routing table of a VPC router of FIG. 6 according to the present disclosure;

FIG. 7B is an IPv6 routing table of an Internet gateway of FIG. 6 according to the present disclosure;

FIG. 7C is a routing table of an IPv6 VPC load balancer of FIG. 6 according to the present disclosure.

DETAILED DESCRIPTION

The following illustrative embodiments are provided to illustrate the present disclosure, these and other advantages and effects can be apparently understood by those in the art after reading the disclosure of this specification. The present disclosure can also be performed or applied by other different embodiments. The details of the specification may be on the basis of different points and applications, and numerous modifications and variations can be devised without departing from the spirit of the present disclosure.

The present disclosure provides an Internet protocol version 4 (IPv4) and Internet protocol version 6 (IPv6) integrated network environment provisioning system under a virtual private cloud (VPC) service architecture, and gives the VPC a connection environment for both IPv4 and IPv6 Internets.

The present disclosure provides IPv6 Internet service and load balancer service in a VPC service architecture. On the premise that the IPv4 service of the existing user end is not affected, a design of an integrated network environment provisioning system for IPv4 and IPv6 is proposed, to give a VPC platform a connection environment encompassing IPv4 and IPv6 Internets and satisfy a compatible use scenario of a transition period of IPv4 and IPv6 and a network environment of IPv6.

Figure 1:
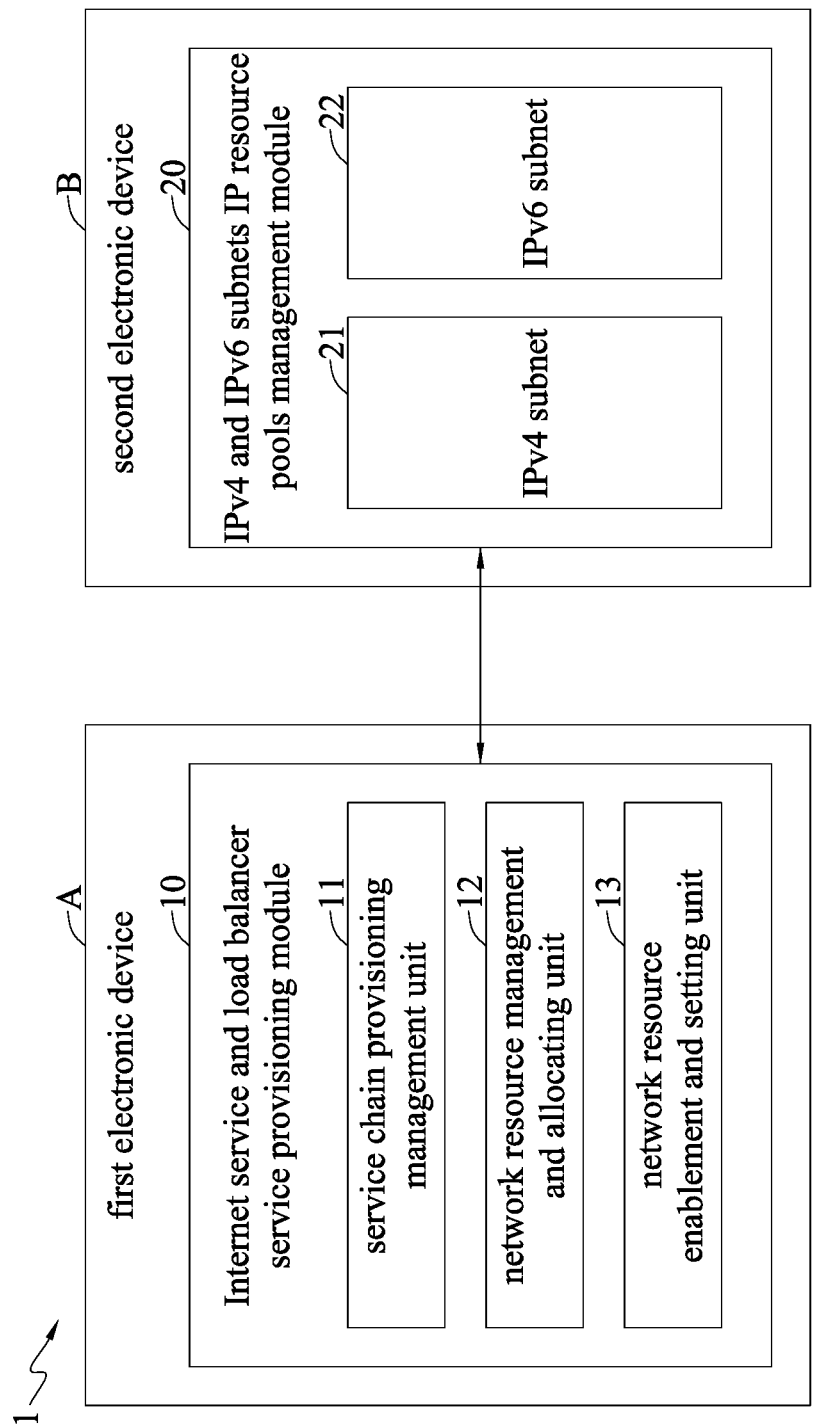
FIG. 1 is a schematic diagram of an Internet service and load balancer service provisioning module and an IPv4 and IPv6 subnets IP resource pools management module of a system for provisioning both IPv4 and IPv6 Internet service and load balancer service according to the present disclosure.

FIG. 1 is a schematic diagram of an Internet service and load balancer service provisioning module 10 and an IPv4 and IPv6 subnets IP resource pools management module 20 of a system 1 for provisioning both IPv4 and IPv6 Internet service and load balancer service according to the present disclosure. The system 1 may comprise the Internet service and load balancer service provisioning module 10 and the IPv4 and IPv6 subnets IP resource pools management module 20, which can be deployed in a first electronic device A (i.e., an identical electronic device), or deployed in the first electronic device A and a second electronic device B (i.e., different electronic devices), respectively. In an embodiment, the first electronic device A or the second electronic device B is a host, a server (e.g., a cloud server or a network server), a computer, or a mobile device.

The Internet service and load balancer service provisioning module 10 may provision or activate IPv4 or IPv6 Internet service and load balancer service in a VPC environment. In a preceding stage, the Internet service and load balancer service provisioning module 10 establishes a plurality of IP resource pools of an IPv4 subnet 21 and an IPv6 subnet 22 (see FIG. 2). In an activating stage of a VPC 30, the Internet service and load balancer service provisioning module 10 may perform a network setting of an Internet interface of a VPC router 31 (see FIG. 3) and a router setting provisioning process in advance.

In an activating stage of an Internet service, the Internet service and load balancer service provisioning module 10 obtains a useable IP address from each of the IP resource pools established in the preceding stage, to perform a series of provisioning processes for activating services, until the Internet service is activated successfully. After the Internet service is activated, a user end (not shown) may apply a load balancer service based on the user's demands. The Internet service and load balancer service provisioning module 10 allocates the network resources and execute a corresponding series of provisioning processes in the activating stage.

From the preceding stage to the service activating stage, three modules, a [1] service chain provisioning management unit 11, a [2] network resource management and allocating unit 12, and a [3] network resource enablement and setting unit 13 of the Internet service and load balancer service provisioning module 10 cooperate to complete the activating process of the Internet service and load balancer service. The functions or the operations of the three modules are described as follows.

The [1] service chain provisioning management unit 11 manages a lifecycle of activating or terminating of the Internet service and load balancer service, and records a plurality of service nodes (e.g., a VPC router 31 and an Internet gateway 50 shown in FIG. 3) provisioned for activating or terminating the Internet service and load balancer service, an order of the plurality of service nodes, and provisioning processes on each of the service nodes. In the activating or terminating stage of the Internet service and load balancer service, the service chain provisioning management unit 11 (the Internet service and load balancer service provisioning module 10) serially integrates the plurality of service nodes into a service chain based on the order of the plurality of service nodes, and executes provisioning processes in order until the Internet service and load balancer service is activated successfully.

The [2] network resource management and allocating unit 12 (the Internet service and load balancer service provisioning module 10) establishes a plurality of IP resource pools based on different usages of the IPv4 subnets 21 and the IPv6 subnets 22, and, in the service activating stage, selects an IP resource pool from the plurality of IP resource pools based on uses to obtain a useable IP address from the selected IP resource pool.

The [3] network resource enablement and setting unit 13 communicates with and activates and sets each of the service nodes (target network function nodes).

Figure 2:
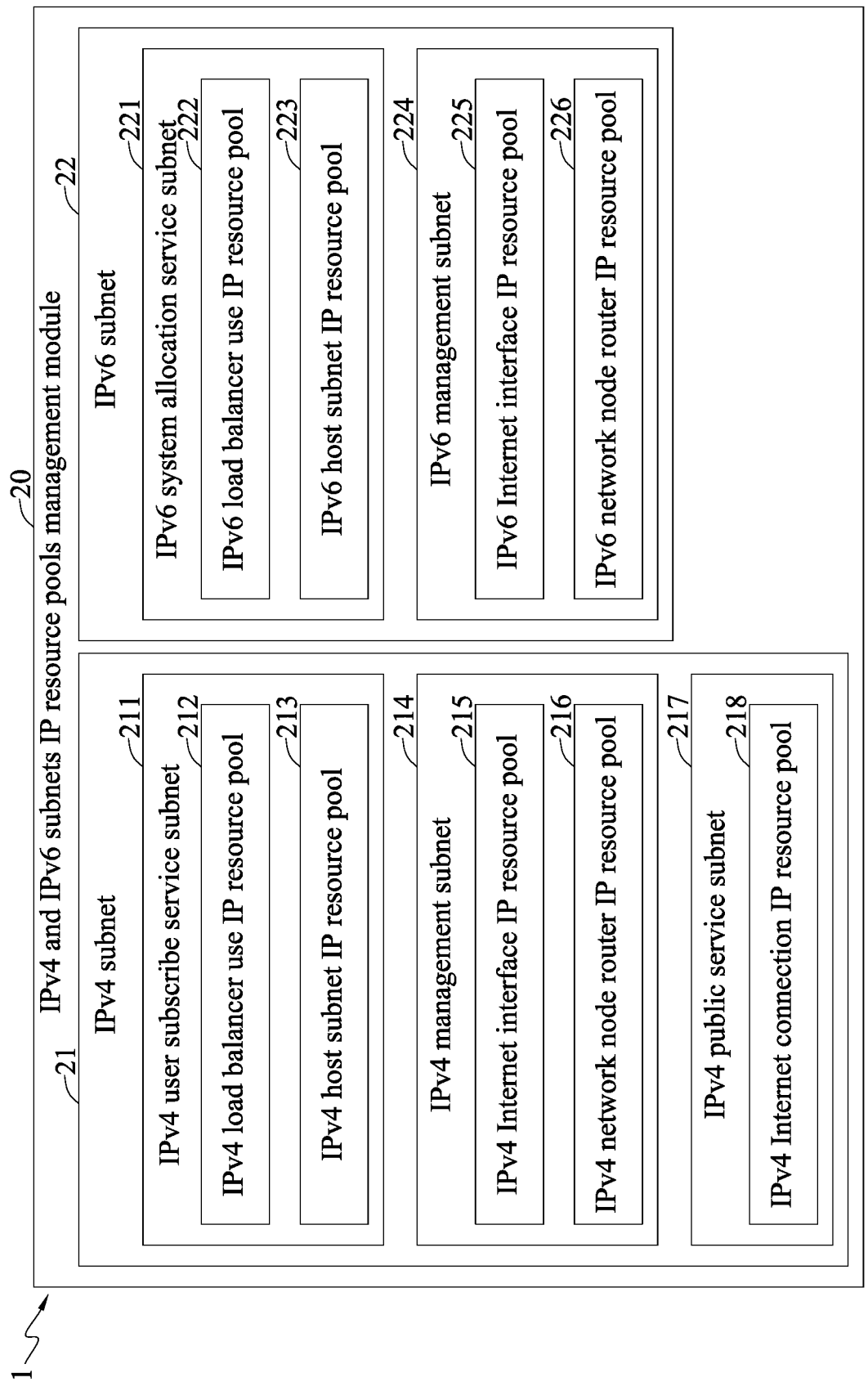
FIG. 2 is a schematic diagram of an IPv4 and IPv6 subnets IP resource pools management module of a system for provisioning both IPv4 and IPv6 Internet service and load balancer service according to the present disclosure.

FIG. 2 is a schematic diagram of an IPv4 and IPv6 subnets IP resource pools management module 20 of the system 1 for provisioning both IPv4 and IPv6 Internet service and load balancer service according to the present disclosure. Please also refer to FIG. 1.

As shown in FIG. 2, the present disclosure proposes how to plan and establish IPv4 and IPv6 subnets and IP resource pools. The Internet service and load balancer service provisioning module 10 (the network resource management and allocating unit 12) of FIG. 1 can establish a plurality of IP resource pools of FIG. 2 based on usages of the IPv4 subnets 21 and the IPv6 subnets 22, and apply the plurality of IP resource pools to an Internet provisioning process in the preceding stage and service activating stage. In an embodiment, the Internet service and load balancer service provisioning module 10 (the network resource management and allocating unit 12) may divide the useable IPv4 subnet 21 and the IPv6 subnet 22 into different subnets based on service and management usages according to special-purpose and the different characteristics between public and private network of IPv4 and IPv6, and establish different IP resource pools in each of the subnets for the activating processes of subsequent Internet services.

In an IPv4 format, the planning of the IPv4 service subnets due to the shortage of global public IPv4 IP employs a private subnet design, providing user ends to set the information of service subnet on their own. The Internet service and load balancer service provisioning module 10 of FIG. 1 divides the self-set subnet into IP resource pools used based on different usages of host network card and load balance.

If the service subnet needs to connect to the IPv4 Internet, the user end needs to apply for a plurality of sets of IPv4 Internet connection subnets. The Internet service and load balancer service provisioning module 10 of FIG. 1 can distribute from the IPv4 public service subnet 217 of the IPv4 subnet 21 of FIG. 2 a network of some or a couple of network segments to establish the IPv4 Internet connection IP resource pool 218, allowing the user end to cooperate and use the IPv4 Internet connection IP resource pool 218 with the network address translation (NAT) technique, to achieve the Internet connection objection. In an embodiment, the IPv4 management subnet 214 selects a public network to satisfy the IPv4 Internet connection function of network nodes.

In the IPv6 format, in order to satisfy the IPv6 all public use network characteristics, the IPv6 service subnet (i.e., the IPv6 system service subnet 221) and the IPv6 management subnet 224 both employ a public use subnet design, and the IPv6 service subnet employs a subnet in which a system distributes host network card and load balance different uses automatically.

The IPv4 and IPv6 subnets IP resource pools management module 20 of FIG. 2 can manage and store a plurality of IP resource pools established by the Internet service and load balancer service provisioning module 10 (the network resource management and allocating unit 12) of FIG. 1 based on the different uses of the IPv4 subnet 21 and the IPv6 subnet 22. In an embodiment, the IPv4 subnet 21 of FIG. 2 comprises: (1) an IPv4 user subscribe service subnet 211 having an IPv4 load balancer use IP resource pool 212 and an IPv4 host subnet IP resource pool 213, (2) an IPv4 management subnet 214 having an IPv4 Internet interface IP resource pool 215 and an IPv4 network node router IP resource pool 216, and (3) an IPv4 public service subnet 217 having an IPv4 Internet connection IP resource pool 218. In another embodiment, the IPv6 subnet 22 of FIG. 2 comprises: (1) an IPv6 system allocation service subnet 221 having an IPv6 load balancer use IP resource pool 222 and an IPv6 host subnet IP resource pool 223, and (2) an IPv6 management subnet 224 having an IPv6 Internet interface IP resource pool 225 and an IPv6 network node router IP resource pool 226.

A plurality of IP resource pools established by the present disclosure based on IP formats and uses are described as follows.

[1] The IPv4 load balancer use IP resource pool 212 belongs to a dedicated network and service use resource pool, and is used for a virtual IP of the IPv4 load balancer service, allowing the user end to assign a set of IP addresses from the IPv4 load balancer use IP resource pool 212.

Figure 3:
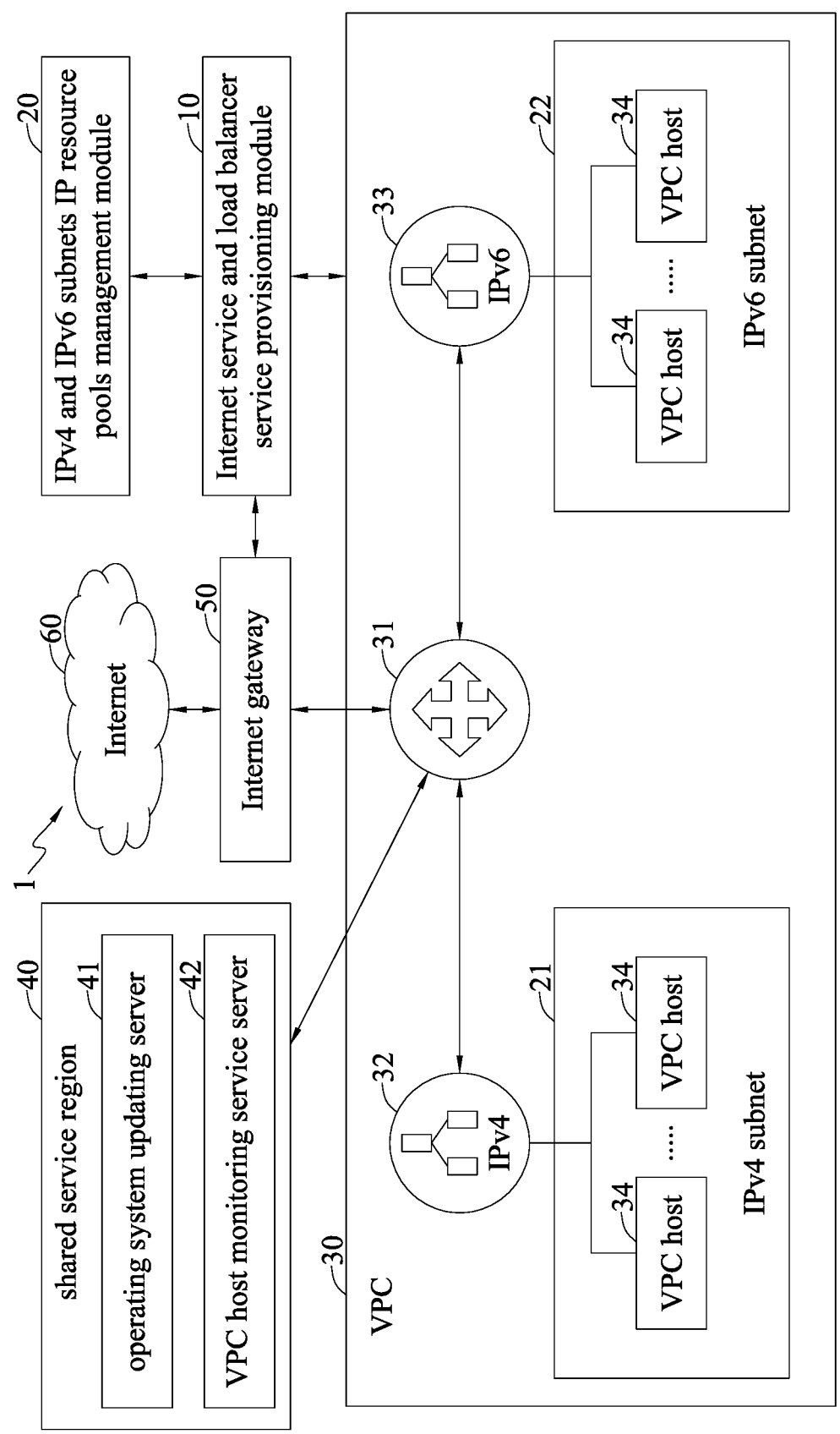
FIG. 3 is an architecture schematic diagram of a system for provisioning both IPv4 and IPv6 Internet service and load balancer service and a VPC Internet service and load balancer service according to the present disclosure.

[2] The IPv4 host subnet IP resource pool 213 belongs to a dedicated network and service use resource pool, and is used for an IP address of a network interface of the VPC host 34 of FIG. 3, allowing the user end to assign a set of IP addresses from the IPv4 host subnet IP resource pool 213.

[3] The IPv4 Internet interface IP resource pool 215 belongs to a public use network and service use resource pool, and is used for an IPv4 Internet interface of the VPC router 31 of FIG. 3, and the Internet service and load balancer service provisioning module 10 of FIG. 1 assigns a set of IP addresses.

[4] The IPv4 network node router IP resource pool 216 belongs to a public use network and management use resource pool, and is used for network IPv4 interface routers of various network functional node of the VPC 30 of FIG. 3, and the Internet service and load balancer service provisioning module 10 of FIG. 1 assigns a set of IP addresses.

[5] The IPv4 Internet connection IP resource pool 218 belongs to a public use network and service use resource pool, and is used for an external IP of network address translation (NAT) services when the VPC host 34 of FIG. 3 is going to connect to the Internet 60, allowing the user end to assign a set of IP addresses from the IPv4 Internet connection IP resource pool 218.

[6] The IPv6 load balancer use IP resource pool 222 belongs to a public use network and service use resource pool, and is used for a virtual IP of the IPv6 load balancer service, and the Internet service and load balancer service provisioning module 10 of FIG. 1 assigns a set of IP addresses.

[7] The IPv6 host subnet IP resource pool 223 belongs to a public use network and service use resource pool, is used for an Internet interface IP of the VPC host 34 of FIG. 3, and employs Stateless Address Autoconfiguration (SLAAC) mechanism and 64-Bit extended unique identifier (EUI-64) algorithm to assign a set of IP addresses automatically.

[8] The IPv6 Internet interface IP resource pool 225 belongs to a public use network and service use resource pool, and is used for an IPv6 Internet interface of the VPC router 31 of FIG. 3, and the Internet service and load balancer service provisioning module 10 of FIG. 1 assigns a set of IP addresses.

[9] The IPv6 network node router IP resource pool 226 belongs to a public use network and management use resource pool, and is used for network IPv6 interface routers of various network functional nodes of the VPC 30 of FIG. 3, and the Internet service and load balancer service provisioning module 10 of FIG. 1 assigns a set of IP addresses.

FIG. 3 is an architectural schematic diagram of a system for provisioning both the IPv4 and IPv6 Internet service and load balancer service and a VPC Internet service and load balancer service according to the present disclosure. Please also refer to FIGS. 1 and 2. As shown in FIG. 3, in addition to the Internet service and load balancer service provisioning module 10 and the IPv4 and IPv6 subnets IP resource pools management module 20 of FIG. 1, the system 1 also comprises a VPC router 31, an IPv4 VPC load balancer 32, an IPv6 VPC load balancer 33, at least one (e.g., a plurality of) VPC host 34, an operating system updating server 41, a VPC host monitoring service server 42 and an Internet gateway 50.

The VPC service architecture of FIG. 3 supports the application of services of a plurality of IPv4 subnet segments or IPv6 subnet segments. With the use of the multi-network card function of the VPC host 34, a plurality of network cards of the VPC host 34 can span across or connect the IPv4 subnet 21 and the IPv6 subnet 22 at the same time, and on the VPC host 34 the user business services of both IPv4 and IPv6 can operate, providing the user end a compatible solution that transits from the IPv4 service environment to the IPv6 environment.

The IPv4 employs a user end self-setting network IP setting method. The IPv6 employs the SLAAC mechanism in cooperation with the EUI-64 algorithm, allowing the network card of the VPC host 34 to obtain an IP address automatically. Therefore, the IP address can be used conveniently and the IP can be managed effectively.

The Internet service and load balancer service provisioning module 10 may manage a service lifecycle from activating to terminating of the Internet service of the VPC 30. In the activating stage of the Internet service, the Internet service and load balancer service provisioning module 10 employs corresponding provisioning processes for the IPv4 or IPv6 Internet connection that the user end is going to activate, and activates the routing table setting of the VPC router 31 and the Internet gateway 50 in order.

In the IPv4 Internet service activating process, the Internet service and load balancer service provisioning module 10 obtains the subnet information of the IPv4 Internet connection IP resource pool to activate. In the IPv6 Internet service activating process, the Internet service and load balancer service provisioning module 10 obtains and activates all the IPv6 service subnet currently in use. After the Internet service is activated, when the user end applies for a new set of IPv4 Internet connection network or IPv6 service subnet, the Internet service and load balancer service provisioning module 10 will provision the router setting of the Internet gateway 50 automatically, to ensure that the newly applied network can be connected to the Internet 60 normally.

In the activating stage of the VPC service, the Internet service and load balancer service provisioning module 10 can set the interface and routing policies of the VPC router 31 in advance to provide a monitoring function and an automatically updating function of an operating system for the VPC host 34 belonged to the user end. In the activating stage of the Internet service, the Internet service and load balancer service provisioning module 10 obtains the IP network segment information belonged to the VPC 30 from corresponding service IP resource pools based on IPv4 or IPv6 formats, to assist, provision and set the routers of the VPC router 31 and the Internet gateway 50, so as to satisfy the objective of activating IPv4 or IPv6 Internet connection.

After the Internet service is activated, if the user end is desired to enhance the service loading and usability of the VPC 30, the user end may select a subnet that is planned to be added to the load balancer service from the IPv4 subnet 21 or the IPv6 subnet 22 of the VPC 30, apply for corresponding IPv4 or IPv6 load balancer service, and use at least one load balancer algorithm to spread the traffic loading of a plurality of VPC hosts 34, so as to achieve the traffic loading balancing effect of a plurality of VPC hosts 34.

When the loading of Internet requests that a single VPC host 34 has to process is increased, the present disclosure provides the user end to select a load balancer service, and the loading can be spread and processed on a plurality of VPC hosts 34 in the subnet. Therefore, after the load balancer service is applied, the Internet service and load balancer service provisioning module 10 may select corresponding load balancer services of the IPv4 or IPv6 based on the IP formats information of the target subnet, and enter the automatic provisioning processes to set the virtual IP address, the interface network IP and routing policy.

To satisfy on demand by the user end to activate the VPC Internet service immediately, in the preceding stage, the Internet service and load balancer service provisioning module 10 may set the preceding network environment. That is, when the platform of the VPC 30 is activated, the Internet service and load balancer service provisioning module 10 sets the Internet interface of the VPC router 31 in advance.

In order for the platform of the VPC 30 of FIG. 3 to support the IPv4 subnet 21 and the IPv6 subnet 22 at the same time, the Internet interface of the VPC router 31 employs IPv4/IPv6 dual stack protocol setting. Two sets of IPs are allocated from the IPv4 Internet interface IP resource pool 215 and the IPv6 Internet interface IP resource pool 225 of FIG. 2, respectively, and are set in the Internet interface of the VPC router 31.

Before the Internet service is activated, the VPC host monitoring service and the operating system updating service should be available for the user end to apply for. Therefore, when the platform of the VPC 30 is activated, the Internet service and load balancer service provisioning module 10 can also activate the router policies of the IPv4 routing table 311 (see FIGS. 4 and 5A) and the IPv6 routing table 312 (see FIGS. 6 and 7A) of the VPC router 31, allowing the VPC host 34 to be connected to the operating system updating server 41 and the VPC host monitoring service server 42 correctly.

When the user end is desired to activate the VPC Internet service on demand, the Internet service and load balancer service provisioning module 10 of FIG. 3 can activate the Internet connection of the VPC host 34 dynamically, to automatically provision the router setting towards Internet on two service nodes of the VPC router 31 and the Internet gateway 50. In an embodiment, the Internet service and load balancer service provisioning module 10 first dispatches the service chain provisioning management unit 11 of FIG. 1, and the service chain provisioning management unit 11 serially integrates the provisioning processes of two service nodes of the VPC router 31 and the Internet gateway 50.

In the provisioning processes of IPv4, the router setting on the Internet gateway 50 of FIG. 3 is provisioned first. The Internet service and load balancer service provisioning module 10 may obtain from the IPv4 Internet connection IP resource pool 218 of FIG. 2 the IP information currently used in this VPC 30 and assemble these IP information as routing polices for the route setting on the Internet gateway. After the routing policies on the Internet gateway are set completely, the service chain provisioning management unit 11 provisions the default route setting of VPC router 31 towards the Internet 60, to complete the provisioning the VPC Internet service of IPv4.

In the provisioning processes of IPv6, the router setting of the Internet gateway 50 of FIG. 3 is provisioned first. The Internet service and load balancer service provisioning module 10 may obtain from the VPC 30 the network segment information of the IPv6 subnet 22 that has been applied, and assemble the network segment information as routing polices for the route setting on the Internet gateway. After the router policies on the Internet gateway are set completely, the service chain provisioning management unit 11 provisions the default route setting of the VPC router 31 towards the Internet 60, to complete the provisioning of the VPC Internet service of IPv6.

The user end can select the VPC Internet service of the previously described IPv4 or IPv6 on demand. The VPC Internet services of two IP formats of IPv4 and IPv6 are independent and do not affect to each other, so as to satisfy a compatible VPC Internet connection requirement for both IPv4 and IPv6.

After the VPC Internet service is activated, the user end may selectively apply for the VPC load balancer service based on IP formats. If the user end is desired to activate the IPv4 VPC load balancer service, the user end can select the IPv4 subnet 21 desired to be load balanced, allowing the Internet service and load balancer service provisioning module 10 to activate corresponding provisioning processes. In an embodiment, available IPs are allocated from the IPv4 load balancer use IP resource pool 212 which is established and divided from the IPv4 user subscribe service subnet 211 of the IPv4 subnet 21 of FIG. 2 by the Internet service and load balancer service provisioning module 10 of FIG. 3, and used to set the virtual IP of the northbound interface of the IPv4 VPC load balancer 32. After obtaining the reserved IP addresses for the use as the gateway IP from the IPv4 host subnet IP resource pool 213 of FIG. 2, the Internet service and load balancer service provisioning module 10 of FIG. 3 performs the network setting and dynamic host configuration protocol (DHCP) setting on the southbound interface of the IPv4 VPC load balancer 32. A set of interface IPs are allocated from the IPv4 network node router IP resource pool 216 of FIG. 2 by the Internet service and load balancer service provisioning module 10 of FIG. 3, and the allocated interface IPs are used to set the network of two interfaces and the router between the two interfaces connecting the VPC router 31 and the IPv4 VPC load balancer 32.

Similarly, if the user end is desired to activate the IPv6 VPC load balancer service, available IPs are allocated by the Internet service and load balancer service provisioning module 10 of FIG. 3 from the IPv6 load balancer use IP resource pool 222 which is established and divided from the IPv6 system allocation service subnet 221 of the IPv6 subnet 22 of FIG. 2, and used to set the virtual IP of the northbound interface of the IPv6 VPC load balancer 33. The Internet service and load balancer service provisioning module 10 of FIG. 3 obtains the reserved IP addresses for the use as gateway IP, and sets the network of the southbound interface of the IPv6 VPC load balancer 33 as well as activates SLAAC mechanism for distributing VPC host IPs automatically. A set of interface IPs are allocated by the Internet service and load balancer service provisioning module 10 of FIG. 3 from the IPv6 network node router IP resource pool 226 of FIG. 2, and are used for setting the network of two interfaces and the router between the two interfaces connecting the VPC router 31 and the IPv6 VPC load balancer 33.

Based on the network segment information of nine IP resource pools of FIG. 2, the embodiments of the provisioning processes relating the IPv4 and IPv6 Internet service and load balancer services in FIG. 4 to FIG. 7C are described as follows.

[1] For the IPv4 load balancer use IP resource pool 212, the network segment information of this IP resource pool is 10.1.1.201 to 10.1.1.250, for example.

[2] For the IPv4 host subnet IP resource pool 213, the network segment information of this IP resource pool is 10.1.1.1 to 10.1.1.250, for example.

[3] For the IPv4 Internet interface IP resource pool 215, the network segment information of this IP resource pool is 210.1.1.1 to 210.1.1.253, for example.

[4] For the IPv4 network node router IP resource pool 216, the network segment information of this IP resource pool is 210.1.3.1 to 210.1.3.8, for example.

[5] For the IPv4 Internet connection IP resource pool 218, the network segment information of this IP resource pool is 210.1.2.1 to 210.1.2.4, for example.

[6] For the IPv6 load balancer use IP resource pool 222, the network segment information of this IP resource pool is available IP 2001:1234:1234:2000:FFFF::1/80, for example.

[7] For the IPv6 host subnet IP resource pool 223, the network segment information of this IP resource pool is available IP 2001:1234:1234:2000::/64 deducted by 2001:1234:1234:3000:FFFF::1/80, for example.

[8] For the IPv6 Internet interface IP resource pool 225, the network segment information of this IP resource pool is available IP 2001:1234:1234:1000::/64, for example.

[9] For the IPv6 network node router IP resource pool 226, the network segment information of this IP resource pool is 2001:1234:1234:3000::1 to 2001:1234:1234:3000::16, for example.

Figure 4:
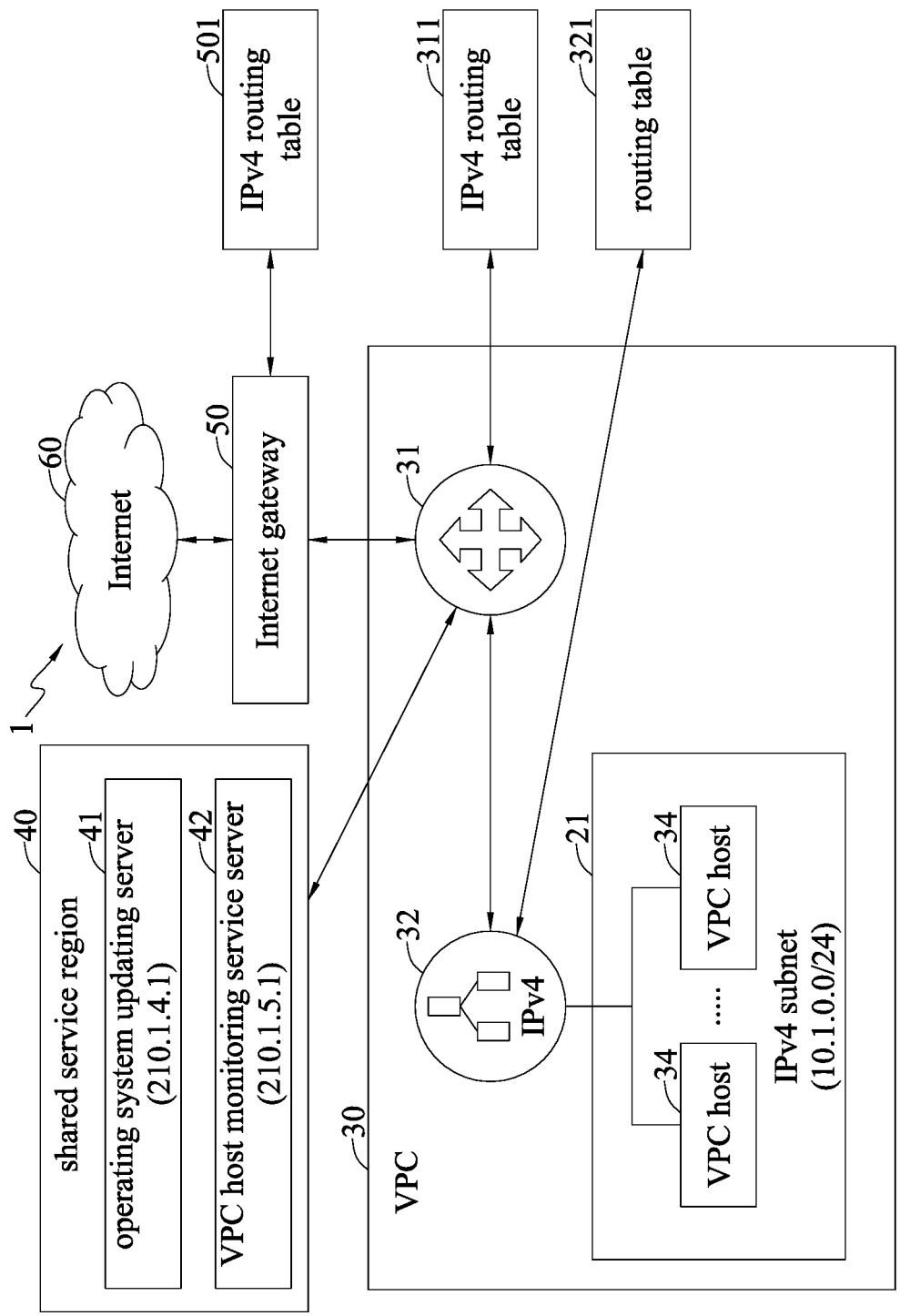
FIG. 4 is a schematic diagram of an embodiment of a provisioning process activating IPv4 VPC Internet service and load balancer service in a system for provisioning both IPv4 and IPv6 Internet service and load balancer service according to the present disclosure.

FIG. 4 is a schematic diagram of an embodiment of the provisioning process relating activating the VPC Internet service and load balancer service of IPv4 in the system 1 provisioning both the IPv4 and IPv6 Internet service and load balancer service according to the present disclosure. This provisioning process may include the following steps [1] to [11]. FIG. 5A is an IPv4 routing table 311 of the VPC router 31 of FIG. 4. FIG. 5B is an IPv4 routing table 501 of the Internet gateway 50 of FIG. 4. FIG. 5C is the routing table 321 of the VPC load balancer 32 of IPv4 of FIG. 4. Please also refer to FIGS. 1 to 3.

[1] A preceding process: establishing the operating system updating server 41 and the VPC host monitoring service server 42 of a shared service region 40 and IPv4 environment setting process of the Internet gateway 50 of FIG. 4.

[2] A preceding process: the activating stage of the VPC 30. The IP address is obtained by the Internet service and load balancer service provisioning module 10 of FIG. 3 from the IPv4 Internet interface IP resource pool 215 of FIG. 2. A network is set at the Internet interface of the VPC router 31 shown in FIGS. 4 and 5A, to set the IP address of the Internet interface of the VPC router 31 to be, for example, 210.1.1.1 (see the IPv4 routing table 311 of the VPC router 31 shown in FIG. 5A).

[3] A preceding process: the activating stage of the VPC 30. In the IPv4 routing table 311 of the VPC router 31 shown in FIGS. 4 and 5A, the routing policies of the destination address (destination network segment address) are set to direct to the operating system updating server 41 (e.g., its IP address is 210.1.4.1, as shown in FIG. 5A) and the VPC host monitoring service server 42 (e.g., its IP address is 210.1.5.1, as shown in FIG. 5A) of FIG. 4.

[4] Automatically provisioning: the activating stage of the IPv4 VPC Internet service. In the IPv4 routing table 501 of the Internet gateway 50 and the routing table setting of FIGS. 4 and 5B, the network segment information (e.g., the destination network segment address is 210.1.2.4/30, as shown in FIG. 5B) of all currently used IPv4 subnets 21 of the VPC 30 is obtained by the Internet service and load balancer service provisioning module 10 of FIG. 3 from the IPv4 Internet connection IP resource pool 218 of FIG. 2, and the network segment information is set to be a destination network segment and directed to the VPC router 31.

[5] Automatically provisioning: the activating stage of the IPv4 VPC Internet service. In the VPC router 31 and its IPv4 routing table 311 of FIGS. 4 and 5A, the destination address (the destination network segment address) of the predefined router is set to be, for example, 0.0.0.0 directed to the Internet gateway 50.

[6] Automatically provisioning: the activating stage of the IPv4 VPC load balancer service. In the IPv4 VPC load balancer 32 and its routing table 321 of FIGS. 4 and 5C, IPs are obtained by the Internet service and load balancer service provisioning module 10 of FIG. 3 from the IPv4 load balancer use IP resource pool 212 of FIG. 2 (e.g., the virtual IP is 10.1.1.201), so as to set the address of the load balancer virtual IP (see FIG. 5C).

[7] Automatically provisioning: the activating stage of the IPv4 VPC load balancer service. In the IPv4 VPC load balancer 32 and its routing table 321 of FIGS. 4 and 5C, the IPs are obtained by the Internet service and load balancer service provisioning module 10 of FIG. 3 from the IPv4 host subnet IP resource pool 213 of FIG. 2 (e.g., the IP is 10.1.0.254), so as to set the network of the southbound interface of the IPv4 VPC load balancer 32 (see FIG. 5C).

[8] Automatically provisioning: the activating stage of the IPv4 VPC load balancer service. In the IPv4 VPC load balancer 32 and its routing table 321 of FIGS. 4 and 5C, the IPs (e.g., the IP is 210.1.3.7) are obtained by the Internet service and load balancer service provisioning module 10 of FIG. 3 from the IPv4 network node router IP resource pool 216 of FIG. 2 (e.g., the network segment information is 210.1.3.0/29), so as to set the network of the northbound interface of the IPv4 VPC load balancer 32 (see FIG. 5C).

[9] Automatically provisioning: the activating stage of the IPv4 VPC load balancer service. In the IPv4 VPC load balancer 32 and its routing table 321 of FIGS. 4 and 5C, the destination address (the destination network segment address) of the predefined router is set to, for example, 0.0.0.0 directed to the VPC router 31.

[10] Automatically provisioning: the activating stage of the IPv4 VPC load balancer service. In the VPC router 31 and its IPv4 routing table 311 of FIGS. 4 and 5A, IPs (e.g., the IP is 210.1.3.1) are obtained by the Internet service and load balancer service provisioning module 10 of FIG. 3 from the IPv4 network node router IP resource pool 216 of FIG. 2, so as to set the network of the load balancing interface of the VPC router 31 (see FIG. 5A).

[11] After completing the activating process of the IPv4 VPC Internet service and load balancer service, the user end can select by himself a load balancing strategy to balance the load.

Figure 6:
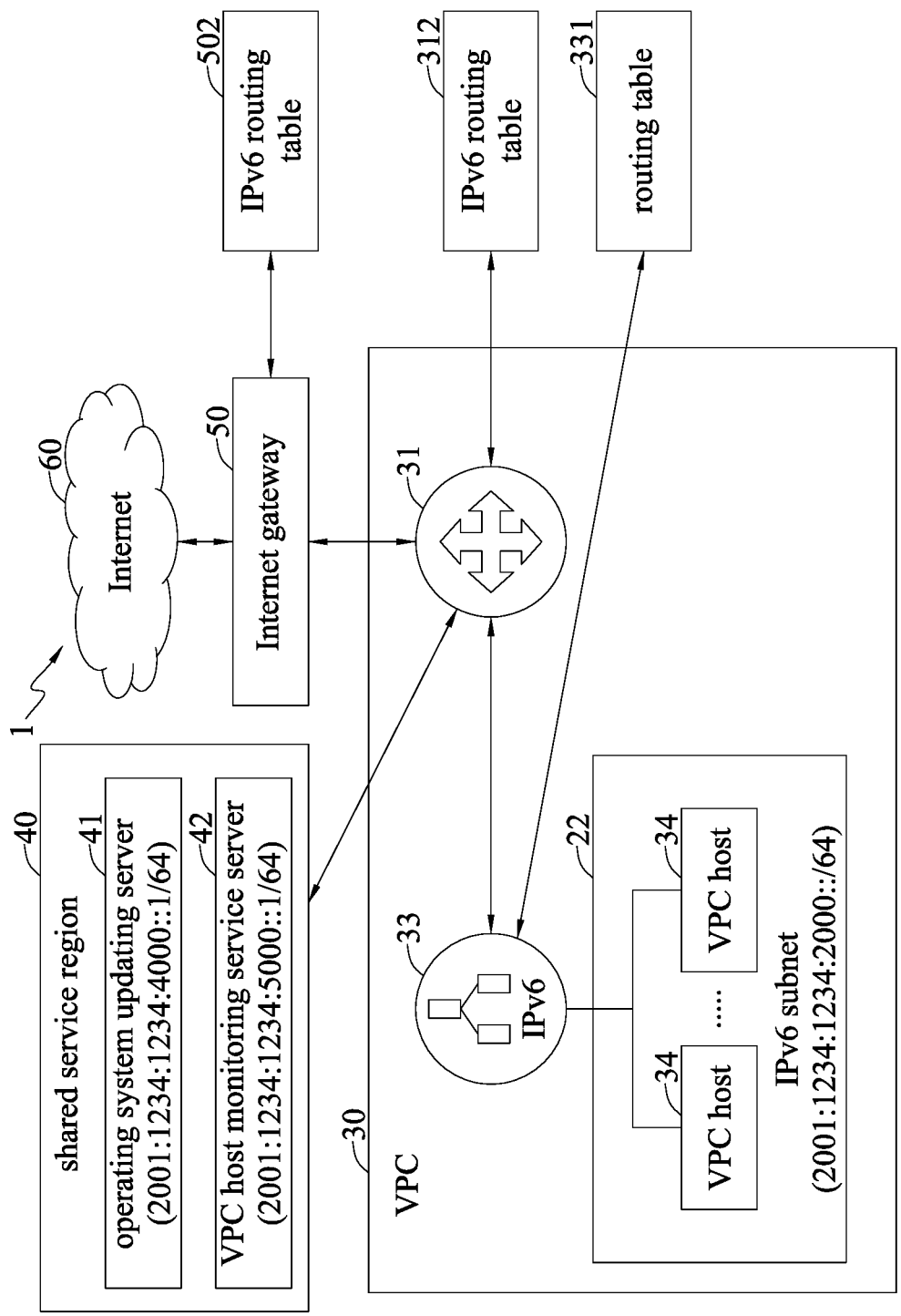
FIG. 6 is a schematic diagram of an embodiment of a provisioning process activating IPv6 VPC Internet service and load balancer service in a system for provisioning both IPv4 and IPv6 Internet service and load balancer service according to the present disclosure.

FIG. 6 is a schematic diagram of an embodiment of a provisioning process relating activating VPC Internet service and load balancer service of IPv6 in the system 1 for provisioning both IPv4 and IPv6 Internet service and load balancer service according to the present disclosure. The provisioning process may include the following steps [1] to [11]. FIG. 7A is an IPv6 routing table 312 of the VPC router 31 of FIG. 6. FIG. 7B is an IPv6 routing table 502 of the Internet gateway 50 of FIG. 6. FIG. 7C is the routing table 331 of an IPv6 VPC load balancer 33 of FIG. 6. Please also refer to FIGS. 1 to 3.

[1] A preceding process: establishing the operating system updating server 41 and the VPC host monitoring service server 42 of a shared service region 40 and IPv6 environment setting process of the Internet gateway 50 of FIG. 6.

[2] A preceding process: when the VPC 30 is activated, the network is set at the Internet interface of the VPC router 31 of FIG. 6, so as to set the IP address of the Internet interface of the VPC router 31 to be, for example, 2001:1234:1234:1000::2/64, as shown in FIG. 7A.

[3] A preceding process: when the VPC 30 is activated, in the IPv6 routing table 312 of the VPC router 31 shown in FIGS. 6 and 7A, the routing policies of the destination address (destination network segment address) are set to direct to the operating system updating server 41 (e.g., its IP address is 2001:1234:1234:4000::1/64, as shown in FIG. 7A) and the VPC host monitoring service server 42 (e.g., its IP address is 2001:1234:1234:5000::1/64, as shown in FIG. 7A) of FIG. 6.

[4] Automatically provisioning: the activating stage of the IPv6 VPC Internet service. In the routing table 501 of the Internet gateway 50, the network segment information (e.g., 2001:1234:1234:2000::/64, as shown in FIG. 7B) of all currently used IPv6 subnets 22 of the VPC 30 is obtained by the Internet service and load balancer service provisioning module 10 of FIG. 3 from the IPv6 host subnet IP resource pool 223 of FIG. 2, and the network segment information is set to be a destination network segment and directed to the VPC router 31.

[5] Automatically provisioning: the activating stage of the IPv6 VPC Internet service. In the IPv6 routing table 312 of the VPC router 31 of FIGS. 6 and 7A, the destination address (the destination network segment address) of the predefined router is set to be, for example, 0:10 directed to the Internet gateway 50. [6] Automatically provisioning: the activating stage of the IPv6 VPC load balancer service. In the IPv6 VPC load balancer 33 and its routing table 331 of FIGS. 6 and 7C, IPs (e.g., the IP is 2001:1234:1234:3000: FFFF::1/80) are obtained by the Internet service and load balancer service provisioning module 10 of FIG. 3 from the IPv6 load balancer use IP resource pool 223 (e.g., its network segment information is 2001:1234:1234:2000: FFFF::/80) of FIG. 2, so as to set the virtual IP address.

[7] Automatically provisioning: the activating stage of the IPv6 VPC load balancer service. In the IPv6 VPC load balancer 33 and its routing table 331 of FIGS. 6 and 7C, the IPs (e.g., the IP is 2001:1234:1234:2000::1/64) are obtained by the Internet service and load balancer service provisioning module 10 of FIG. 3 from the IPv6 host subnet IP resource pool 223 of FIG. 2, so as to set the network of the southbound interface of the IPv6 VPC load balancer 33 and the SLAAC mechanism that the southbound interface of the IPv6 VPC load balancer 33 activates.

[8] Automatically provisioning: the activating stage of the IPv6 VPC load balancer service. In the IPv6 VPC load balancer 33 and its routing table 331 of FIGS. 6 and 7C, the IPs (e.g., the IP is 2001:1234:1234:3000::2/124) are obtained by the Internet service and load balancer service provisioning module 10 of FIG. 3 from the IPv6 network node router IP resource pool 226 (e.g., its network segment information is 2001:1234:1234:3000::/124) of FIG. 2, so as to set the network of the northbound interface of the IPv6 VPC load balancer 33 (see FIG. 7C).

[9] Automatically provisioning: the activating stage of the IPv6 VPC load balancer service. In the IPv6 VPC load balancer 33 and its routing table 513 of FIGS. 6 and 7C, the destination address (the destination network segment address) of the predefined router is set to, for example, 0::/0, directed to the VPC router 31.

[10] Automatically provisioning: the activating stage of the IPv6 VPC load balancer service. In the VPC router 31 and its IPv6 routing table 312 of FIGS. 6 and 7A, IPs (e.g., the IP is 2001:1234:1234:3000::1/124) are obtained by the Internet service and load balancer service provisioning module 10 of FIG. 3 from the IPv6 network node router IP resource pool 226 (e.g., 2001:1234:1234:3000::/124) of FIG. 2, so as to set the network of the load balancing interface of the VPC router 31 (see FIG. 7A).

[11] After completing the activating process of the IPv6 VPC Internet service and load balancer service, the user end can select by himself a load balancing strategy to balance the load.

The user end can apply for the IPv4 or IPv6 Internet service and load balancer service on demand, the two IP formats of services of IPv4 and IPv6 can coexist in the VPC service architecture, and the IPv4 and IPv6 service traffics share the VPC router 31, the Internet gateway 50, and the operating system updating server 41 and VPC host monitoring service server 42 of the shared service region 40.

The present disclosure satisfies the compatibility of the two IP formats of IPv4 and IPv6 and the reuse of the service nodes in the VPC service architecture, and ensures that the service traffics of the two IP formats of IPv4 and IPv6 are independent and do not interfere to each other, to allow the user end to individually select the IPv4 or IPv6 Internet service and load balancer service on demand. This design satisfies the purpose of allowing the user end to use both the IPv4 and IPv6 Internet services.

Figure 8:
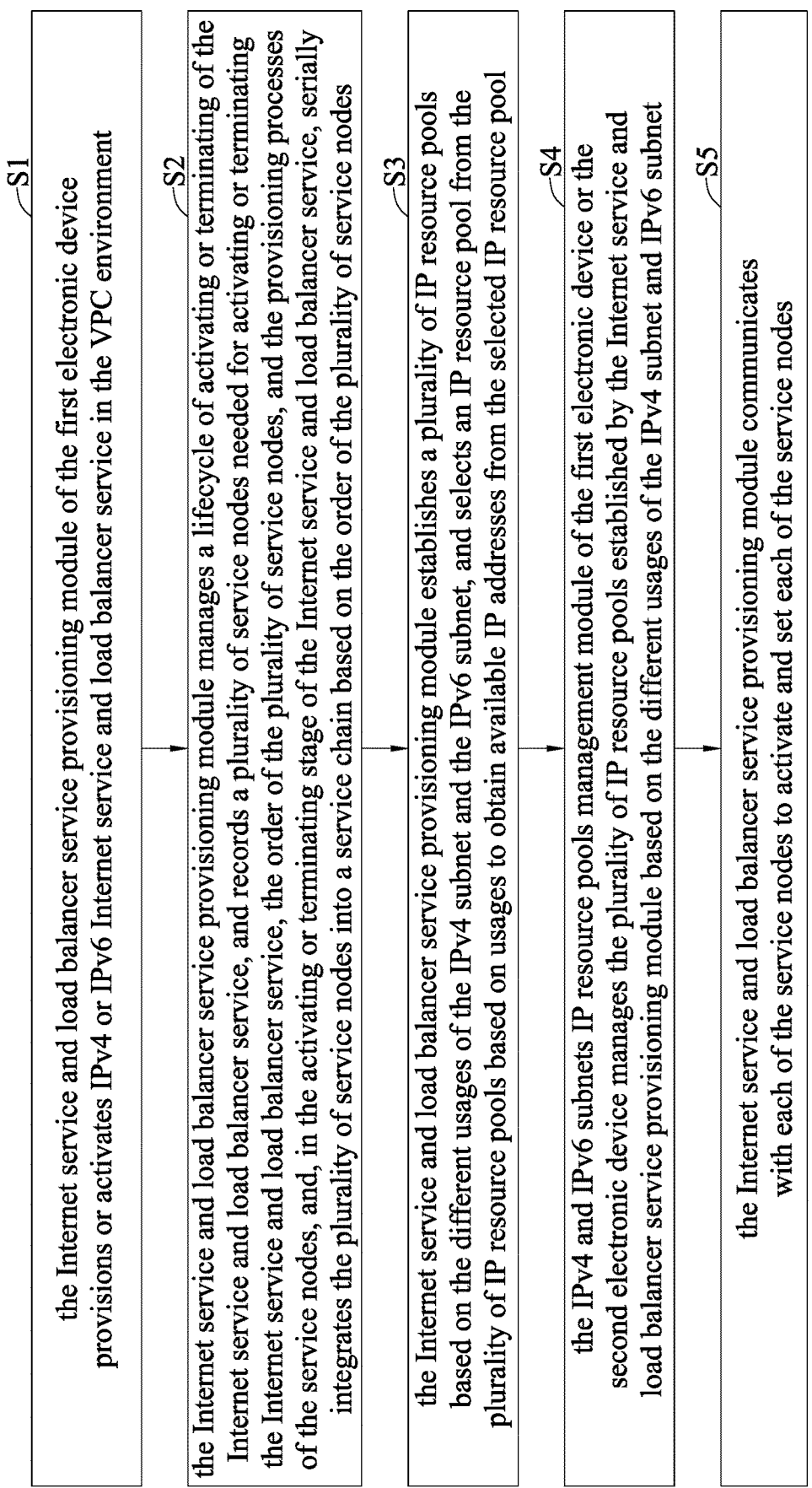
FIG. 8 is a flow chart of a method for provisioning both IPv4 and IPv6 Internet service and load balancer service according to the present disclosure.

FIG. 8 is a schematic diagram of a flowchart of a method for provisioning both IPv4 and IPv6 Internet service and load balancer service according to the present disclosure. Please also refer to FIGS. 1-3. The main technical contents of the method for provisioning both IPv4 and IPv6 Internet service and load balancer service are described as follows, and the remaining technical contents have been described in FIGS. 1 to 7C, further description thereof hereby omitted.

In step S1 of FIG. 8, the Internet service and load balancer service provisioning module 10 of the first electronic device A provisions or activates IPv4 or IPv6 Internet service and load balancer service in the VPC environment.

In step S2 of FIG. 8, the Internet service and load balancer service provisioning module 10 of the first electronic device A manages a lifecycle of activating or terminating of the Internet service and load balancer service, and records a plurality of service nodes (e.g., the VPC router 31 and the Internet gateway 50) needed for activating or terminating the Internet service and load balancer service, the order of the plurality of service nodes, and the provisioning processes of each of the service nodes. In the activating or terminating stage of the Internet service and load balancer service, the Internet service and load balancer service provisioning module 10 serially integrates the plurality of service nodes into a service chain based on the order of the plurality of service nodes.

In step S3 of FIG. 8, the Internet service and load balancer service provisioning module 10 of the first electronic device A establishes a plurality of IP resource pools based on the different usages of the IPv4 subnet 21 and the IPv6 subnet 22, and selects an IP resource pool from the plurality of IP resource pools based on usages to obtain available IP addresses from the selected IP resource pool.

In step S4 of FIG. 8, the IPv4 and IPv6 subnets IP resource pools management module 20 of the first electronic device A or the second electronic device B manages the plurality of IP resource pools established by the Internet service and load balancer service provisioning module 10 based on the different usages of the IPv4 subnet 21 and IPv6 subnet 22.

In step S5 of FIG. 8, the Internet service and load balancer service provisioning module 10 of the first electronic device A communicates with each of the service nodes to activate and set each of the service nodes.

The system and method for provisioning both the IPv4 and IPv6 Internet service and load balancer service according to the present disclosure have at least the following characteristics, advantages and technical effects.

The present disclosure provides, under the VPC service architecture, IPv4 and IPv6 integrated network environment provisioning system, allowing the VPC to have both the IPv4 and IPv6 Internet connection environments.

The present disclosure, in the VPC service architecture, satisfies the compatibility of the two IP formats of IPv4 and IPv6 and the reuse of the service nodes, and ensures that the service traffics of the two IP formats of IPv4 and IPv6 are independent and do not interfere to each other, to allow the user end to individually select the IPv4 or IPv6 Internet service and load balancer service on demand. This design satisfies the purpose of allowing the user end to use both the IPv4 and IPv6 Internet services.

The present disclosure, in the IPv4 format, in which the IPv4 service subnet planning due to the shortage of the global public use IPv4 IP employs a private subnet design, allowing the user end to set the information of service subnet by himself and to divide the subnets into IP resource pools based on different uses of host network card and load balance.

The present disclosure is proposed in the IPv6 format, to satisfy the IPv6 global public use network characteristics, in which the IPv6 service subnet and the IPv6 management subnet both employ the public use subnet design, and the IPv6 service subnet employs subnet in which the system distributes host network card and load balance different uses automatically.

According to the present disclosure, the Internet service and load balancer service provisioning module manages the lifecycle of the activating to terminating Internet service of the VPC, and in the activating stage of the Internet service, employs corresponding provisioning processes for the IPv4 or IPv6 Internet connection that the user end is desired to activate, so as to activate the routing table setting of the VPC router and the Internet gateway in order.

According to the present disclosure, after the Internet connection service is activated, with the business development of the user end, when the loading of the Internet request that a single VPC host in the subnet has to process is increased, the user end is allowed to select a load balancer service. The load balancer service is used for spreading the request traffic loading to a plurality of VPC hosts in the subnet for processing. Therefore, after the load balancer service is applied, the Internet service and load balancer service provisioning module can select the corresponding load balancer service of IPv4 or IPv6 based on the IP formats of the subnet of the target, and set the virtual IP address, the interface network IP and routing policies.

The VPC service architecture according to the present disclosure supports the services of a plurality of IPv4 subnet segments or IPv6 subnet segments, and uses the multi-network card function of the VPC host. A plurality of network cards of the VPC host span across or connect the IPv4 subnet and IPv6 subnet at the same time. The user business services of IPv4 and IPv6 can be operate on the VPC host. The user end is thus provided with a compatible solution that transits from the IPv4 service environment to the IPv6 environment.

The present disclosure can be applied to a variety of industries, such as cloud computing (e.g., public cloud, private cloud or hybrid cloud), software-defined data center business service, etc. The present disclosure can also be applied to a variety of products, such as a cloud business support system, cloud operation support system, a service chain provisioning process managing system, etc.

The foregoing descriptions of the detailed embodiments are illustrated to disclose the features and functions of the present disclosure and not restrictive of the scope of the present disclosure. It should be understood to those in the art that all modifications and variations according to the spirit and principle in the present disclosure should fall within the scope of the appended claims.

What is claimed is:

1. A system for provisioning both Internet protocol version 4 (IPv4) and Internet protocol version 6 (IPv6) Internet service and load balancer service, the system comprising:
    an Internet service and load balancer service provisioning module deployed in a first electronic device and configured for provisioning or activating IPv4 or IPv6 Internet service and load balancer service in a virtual private cloud (VPC) environment, the Internet service and load balancer service provisioning module having:
        a service chain provisioning management unit configured for managing a lifecycle of activating or terminating the Internet service and load balancer service, and for recording a plurality of service nodes provisioned for activating or terminating the Internet service and load balancer service, and an order of the plurality of service nodes and provisioning processes of each of the service nodes, wherein in a activating or terminating stage of the Internet service and load balancer service, the service chain provisioning management unit serially integrates the plurality of service nodes into a service chain based on the order of the plurality of service nodes;
        a network resource enablement and setting unit configured for communicating with each of the service nodes for activating and setting each of the service nodes; and
        a network resource management and allocating unit configured for establishing a plurality of IP resource pools based on different usages of an IPv4 subnet and an IPv6 subnet, selecting an IP resource pool from the plurality of IP resource pools based on usages, and obtaining an available IP address from the selected IP resource pool; and
    an IPv4 and IPv6 subnets IP resource pools management module deployed in the first electronic device or a second electronic device and configured for managing the plurality of IP resource pools established by the IPv4 and IPv6 subnets IP resource pools management module and provides the IP resource pools based on the different usages of the IPv4 subnet and the IPv6 subnet.

2. The system of claim 1, wherein the IPv4 subnet includes an IPv4 user subscribe service subnet having an IPv4 load balancer use IP resource pool and an IPv4 host subnet IP resource pool, a IPv4 management subnet having an IPv4 Internet interface IP resource pool and an IPv4 network node router IP resource pool, and an IPv4 public service subnet having an IPv4 Internet connection IP resource pool.

3. The system of claim 1, wherein the IPv6 subnet includes an IPv6 system allocation service subnet having an IPv6 load balancer use IP resource pool and an IPv6 host subnet IP resource pool, and an IPv6 management subnet having an IPv6 Internet interface IP resource pool and an IPv6 network node router IP resource pool.

4. The system of claim 1, wherein the IPv4 and IPv6 subnets IP resource pools management module divides the IPv4 subnet and the IPv6 subnet into different subnets based on service and management purpose and public network characteristics of IPv4 and IPv6, and establish different IP resource pools in each of the subnets.

5. The system of claim 1, wherein the Internet service and load balancer service provisioning module allocates a network segments each time from a public service subnet of the IPv4 subnet to establish an IPv4 Internet connection IP resource pool, and coordinates the IPv4 Internet connection IP resource pool with a service use of a network address translation (NAT) technique.

6. The system of claim 1, further comprising a VPC router and an Internet gateway, wherein in the activating stage of the Internet service, the Internet service and load balancer service provisioning module sets corresponding provisioning processes that a user end is desired to take to activate an IPv4 or IPv6 Internet connection for activating a routing table setting of the VPC router and the Internet gateway.

7. The system of claim 6, further comprising an operating system updating server and a VPC host monitoring service server, wherein services of two IP formats of IPv4 and IPv6 coexist in a VPC service architecture, and service traffic of the IPv4 and IPv6 is shared by the VPC router, the Internet gateway, the operating system updating server and the VPC host monitoring service server.

8. The system of claim 1, further comprising at least one VPC host having multiple network card functions, and configured for spanning or being connected to the IPv4 subnet and the IPv6 subnet at the same time, and operating user business services of both IPv4 and IPv6.

9. The system of claim 8, wherein the IPv4 employs a user end self-setting network IP setting method, and the IPv6 employs a stateless address autoconfiguration (SLAAC) mechanism in cooperation with a 64-bit extended unique identifier (EUI-64) algorithm, to allow network cards of the VPC host to obtain an IP address automatically.

10. The system of claim 1, further comprising a plurality of VPC hosts, and after the Internet service is activated, a user end selects from the IPv4 subnet or the IPv6 subnet a subnet that is desired to be added to a load balancer service and applies for a corresponding IPv4 or IPv6 load balancer service, and at least one load balancer algorithm is used to spread load of the plurality of VPC hosts.

11. A method for provisioning both IPv4 and IPv6 Internet service and load balancer service, comprising:
provisioning or activating, by an Internet service and load balancer service provisioning module of a first electronic device, IPv4 or IPv6 Internet service and load balancer service in a VPC environment;
managing, by the Internet service and load balancer service provisioning module of the first electronic device, a lifecycle of activating or terminating the Internet service and load balancer service, and recording a plurality of service nodes provisioned for activating or terminating the Internet service and load balancer service, and an order of the plurality of service nodes and provisioning processes of each of the service nodes, wherein in a activating or terminating stage of the Internet service and load balancer service, the Internet service and load balancer service provisioning module serially integrates the plurality of service nodes into a service chain based on the order of the plurality of service nodes;
establishing, by the Internet service and load balancer service provisioning module of the first electronic device, a plurality of IP resource pools based on different usages of an IPv4 subnet and an IPv6 subnet, selecting, by the Internet service and load balancer service provisioning module, an IP resource pool from the plurality of IP resource pools based on a usage, and obtaining a useable IP address from the selected IP resource pool;
managing, by an IPv4 and IPv6 subnets IP resource pools management module of the first electronic device or a second electronic device, the plurality of IP resource pools established by the Internet service and load balancer service provisioning module based on the different uses of the IPv4 subnet and the IPv6 subnet; and
communicating, by the Internet service and load balancer service provisioning module of the first electronic device, with each of the service nodes to activate and set each of the service nodes.

12. The method of claim 11, further comprising in an activating stage of the Internet service, setting, by the Internet service and load balancer service provisioning module, the corresponding provisioning processes for an IPv4 or IPv6 Internet connection that a user end is desired to take to activate for activating a routing table setting of a VPC router and an Internet gateway.

13. The method of claim 11, wherein services of two formats of IPv4 and IPv6 coexist in a VPC service architecture, and service traffic of the IPv4 and IPv6 is compatible with a VPC router, an Internet gateway, an operating system updating server and a VPC host monitoring service server.

14. The method of claim 11, further comprising after the Internet service is activated, a user end selects from the IPv4 subnet or the IPv6 subnet a subnet that is desired to be added to a load balancer service and applies for a corresponding IPv4 or IPv6 load balancer service, and at least one load balancer algorithm is used to spread request traffic load of a plurality of VPC hosts.

15. The method of claim 11, further comprising allocating, by an IPv4 load balancer use IP resource pool divided and established by the Internet service and load balancer service provisioning module from an IPv4 user subscribe service subnet of the IPv4 subnet, an available IP, and setting a virtual IP of a northbound interface of an IPv4 VPC load balancer.

16. The method of claim 11, further comprising allocating, by an IPv6 load balancer use IP resource pool divided and established by the Internet service and load balancer service provisioning module from an IPv6 system allocation service subnet of the IPv6 subnet, an available IP, and setting a virtual IP of a northbound interface of an IPv6 VPC load balancer.

17. The method of claim 11, further comprising obtaining, by the Internet service and load balancer service provisioning module of the first electronic device, an IP from an IPv4 host subnet IP resource pool, and performing a network setting of a southbound interface of an IPv4 VPC load balancer.

18. The method of claim 11, further comprising obtaining, by the Internet service and load balancer service provisioning module of the first electronic device, an IP from an IPv6 host subnet IP resource pool, performing a network setting of a southbound interface of an IPv6 VPC load balancer, and activating an setting of an SLAAC mechanism at the southbound interface of the IPv6 VPC load balancer.

19. The method of claim 11, further comprising allocating, by the Internet service and load balancer service provisioning module of the first electronic device, a set of interface IPs from an IPv4 network node router IP resource pool, and using the allocated interface IPs to perform a network setting of two interfaces of a VPC router and an IPv4 VPC load balancer connection and a router setting between interfaces.

20. The method of claim 11, further comprising allocating, by the Internet service and load balancer service provisioning module of the first electronic device, a set of interface IPs from an IPv6 network node router IP resource pool, and using the allocated interface IPs to perform a network setting of two interfaces of a VPC router and an IPv6 VPC load balancer connection and a router setting between interfaces.

* * * * *